(12) United States Patent
Chu et al.

(10) Patent No.: US 7,321,834 B2
(45) Date of Patent: Jan. 22, 2008

(54) METHOD FOR CALCULATING POWER FLOW SOLUTION OF A POWER TRANSMISSION NETWORK THAT INCLUDES INTERLINE POWER FLOW CONTROLLER (IPFC)

(75) Inventors: Chia-Chi Chu, Kwei-Shan (TW); Sheng-Huei Lee, Kwei-Shan (TW); Hung-Chi Tsai, Kwei-Shan (TW)

(73) Assignee: Chang Gung University, Kwei-Shan (TW)

( * ) Notice: Subject to any disclaimer, the term of this patent is extended or adjusted under 35 U.S.C. 154(b) by 61 days.

(21) Appl. No.: 11/183,051

(22) Filed: Jul. 15, 2005

(65) Prior Publication Data

US 2007/0027642 A1 Feb. 1, 2007

(51) Int. Cl.
*H02J 3/04* (2006.01)
(52) U.S. Cl. .................. 702/60; 702/179; 702/188; 702/117; 307/102; 307/98; 307/99; 700/287; 700/293; 700/297; 700/291; 323/207; 323/282; 363/81
(58) Field of Classification Search ............... 702/581, 702/60, 64, 67, 75, 179–181, 117, 188; 307/98, 307/99, 102; 323/207, 282; 363/81; 700/287, 700/297, 293, 291
See application file for complete search history.

(56) References Cited

U.S. PATENT DOCUMENTS

| | | | |
|---|---|---|---|
| 5,698,969 A | 12/1997 | Gyugyi | 323/207 |
| 5,808,452 A * | 9/1998 | Gyugyi et al. | 323/207 |
| 6,011,381 A * | 1/2000 | Andrei | 323/215 |
| 6,025,701 A * | 2/2000 | Weinhold | 323/207 |
| 6,411,065 B1 * | 6/2002 | Underwood et al. | 322/20 |
| 6,414,853 B2 * | 7/2002 | Buckles et al. | 363/14 |
| 6,498,464 B1 * | 12/2002 | Doht et al. | 323/247 |
| 6,577,108 B2 * | 6/2003 | Hubert et al. | 323/207 |
| 6,963,187 B2 * | 11/2005 | Bebic et al. | 323/207 |

OTHER PUBLICATIONS

Edris, A-A., Adapa, R., Baker, M. H., Bohmann, L., Clark, K., Habashi, K., Gyugyi, L., Lemay, J., Mehraban, A. S., Myers, A. K., Reeve, J., Sener, F., Torgerson, D. R., Wood, R. R., "Proposed Terms and Definitions for Flexible AC Tranmission System (FACTS)", IEEE Transactions on Power Delivery, vol. 12, No. 4, Oct 1997, pp. 1848-1853.

(Continued)

*Primary Examiner*—Carol S. W. Tsai
(74) *Attorney, Agent, or Firm*—C. G. Mersereau; Nikolai & Mersereau, P.A.

(57) ABSTRACT

Power flow models of Interline Power Flow Controllers (IPFC) for large-scale power systems are studied, in details. Mathematical models of the IPFC, using the d-q axis decompositions of control parameters are derived. In this framework, for each IPFC, only two control parameters are added to the unknown vector in the iteration formula and the quadratic convergence characteristic is preserved. Simulations results from several practical large-scale power systems embedded with multiple Convertible Static Compensators (CSCs) demonstrate the effectiveness of the proposed models. Comparisons with existing models are made to elucidate the performance of the convergence.

8 Claims, 7 Drawing Sheets

OTHER PUBLICATIONS

Gyugyi, L., Kalyan, K., Schauder C. D., "The Interline Power Flow Controller Concept: A New Approach to Power Flow Management in Transmission Systems", IEEE Transactions on Power Delivery, vol. 14, No. 3, Jul. 1999, pp. 1115-1123.

Zhang, X. -P., "Modelling of the interline power flow controller and the generalised unified power flow controller in Newton power flow", IEE Proc.-Gener. Transm. Distrib., vol. 150, No. 3, May 2003, pp. 268-274.

Wei, X. Chow, J. H., Fardanesh, B. & Edris, A-A., "A Common Modeling Framework of Voltage-Sourced Converters for Load Flow, Sensitivity and Dispatch Analysis", IEEE Transactions on Power Systems, vol. 19, No. 2, May 2004, pp. 934-941.

Fardanesh, B., "Optimal Utilization, Sizing, and Steady-State Performance Comparison of Multiconverter VSC-Based FACTS Controllers", IEEE Transactions on Power Delivery, vol. 19, No. 3, Jul. 2004, pp. 1321-1327.

* cited by examiner

Iteration numbers of Tested System Required for Power Flow Solutio in Different Cases

| Case | A | B | C | D |
|---|---|---|---|---|
| Iterati number | 5 | 5 | 5 | 6 |

Fig.7

METHOD FOR CALCULATING POWER FLOW SOLUTION OF A POWER TRANSMISSION NETWORK THAT INCLUDES INTERLINE POWER FLOW CONTROLLER (IPFC)

BACKGROUND OF THE INVENTION

Field of the Invention

The present invention relates generally to a steady-state model of an Interline Power Flow Controller (IPFC) in this technical field, and more particularly to an improved method for incorporating the IPFC model into a power flow solver which can be applied to simulation software of power systems. Not only does this method deliver a feature of rapid convergence, but it also considers the actual losses arising from the IPFC. So, it serves as an important foundation for installation and control of the Interline Power Flow Controller (IPFC), while expanding and facilitating the congestion management/prevention of power systems.

The newly-developed flexible AC transmission system is composed of VSCs (voltage source-based converters). Typical examples of USCs are Static Synchronous Compensator (STATCOM), Static Synchronous Compensator (SSSC), Unified Power Flow Controller (UPFC) and Interline Power Flow Controller (IPFC). Of which, many scholars put efforts on the study of steady-state models of IPFC relating to the calculation of the power flow, among whom Gyugyi, L. was the first one to put forward the IPFC for controlling the power flow in an electric transmission system in 'Apparatus and Method for Interline Power Flow Control' (U.S. Pat. No. 5,698,969, Dec. 16, 1997).

Moreover, the basic theory and operating principle of the IPFC were initiated in 1999 by Gyugyi, L., Sen, K. and Schauder, C.: 'The Interline Power Flow Controller Concept: a New Approach to Power Flow Management in Transmission Systems', (IEEE Trans. on Power Delivery, Vol. 3, No. 14, 1999, pp. 1115-1123). This article showed that the IPFC can resolve the congestion of a transmission system by adjusting the active power and the reactive power flow of the transmission line.

Furthermore, a Newton-Raphson (NR) algorithm incorporating of the IPFC steady-state model was developed in 2003 by X.-P. Zhang, "Modeling of the Interline Power Flow Controller and the Generalized Unified Power Flow Controller in Newton Power Flow", (IEE Proceedings. Generation, Transmission & Distribution, Vol. 150, No. 3, May. 2003, pp. 268-274). This article provided a Newton-Raphson algorithm for power flow analysis when a power system is embedded with IPFC.

Subsequently, the application of the IPFC based on VSC was further developed by B. Fardansh: 'Optimal Utilization, Sizing, and Steady-State Performance Comparison of Multi-level VSC-Based FACTS Controller' (IEEE Trans. on Power Delivery, Vol. 19, No. 3, July. 2004, pp. 1321-1327)—and Xuan. Wei, J. H. Chow, Behurz Fardanesh and Abdel-Aty Edris: 'A Common Modeling Framework of Load Flow, Sensitivity, and Dispatch Analysis' (IEEE Trans. on Power System, Vol. 19, No. 2, May. 2004, pp. 934-941).

In fact, Interline Power Flow Controller (IPFC) is based on a framework wherein Voltage Source Converters (VSCs) are linked to a DC coupling capacitor. Among the VSCs, one of the converters is a system with one degree of freedom, which is able to adjust the active or reactive power of a transmission line, whereas each of the remaining converters is a system with two degrees of freedom, which is able to adjust simultaneously the active and reactive power of a plurality of transmission lines.

Owing to an increasing electrical load demand, existing power transmission systems cannot satisfy the requirements of long-distance and high-capacity power transmission. Also, erection of new transmission lines remains limited for environmental protection purposes. Therefore, an important approach to resolve this problem would be utilizing the potential capability of the existing transmission network by improving the power flow distribution. Additionally, as power systems operate in a more complex environment with the adoption of market-oriented power management systems, the power system must have a stronger control ability to meet the technical and economical requirements of customers.

SUMMARY OF THE INVENTION

Thus, the objective of the present invention is to provide a method for incorporating the steady-state model of an Interline Power Flow Controller (IPFC) into a Newton Raphson algorithm. The steady-state model of IPFC can take into account the losses arising from coupling transformers, without compromise of the rapid convergence characteristic for the system solution, while the speed of convergence is insensitive to the selection of the initial values of the control variables of the IPFC model, thus exhibiting the advantages of a new model such as robustness and rapid convergence.

To accomplish the previously mentioned object, Interline Power Flow Controller (IPFC) comprises a plurality of VSCs and a DC coupling capacitor, where all converters are linked to the DC coupling capacitor. Among the VSCs, one converter is a system with one degree of freedom, which is able to adjust the active or reactive power of transmission line, whereas each of the remaining converters is a system with two degrees of freedom, which is able to adjust simultaneously the active and reactive power of a plurality of transmission lines, thus avoiding efficiently the congestion of the transmission system. When the Newton-Raphson method is used to calculate unknown control variables, the variables of the IPFC model are expressed in d-q components. This feature can preserve the characteristic of rapid convergence and reduce both the complexity of computation and the number of control variables incorporating into the iteration formula.

The other features and advantages of the present invention will be more readily understood upon a thoughtful deliberation of the following detailed description of a preferred embodiment of the present invention with reference to the accompanying drawings and icons. However, it should be appreciated that the present invention is capable of a variety of embodiments and various modifications by those skilled in the art, and all such variations or changes shall be embraced within the scope of the following claims.

BRIEF DESCRIPTION OF THE DRAWINGS

FIG. 7 refers to Table 1 of the present invention.

DETAILED DESCRIPTION OF THE INVENTION

The present invention intends to provide a method for incorporating a steady-state model of IPFC into the Newton-Raphson algorithm. The steady-state model according to the present invention can fully depict the reactive power compensation and the active power exchanged among VSCs, and take into account of the losses arising from coupling transformers. An interline Power Flow Controller (IPFC) comprises a plurality of VSCs and a DC coupling capacitor, where the DC sides of converters are linked together to the DC coupling capacitor. Among the VSCs, one converter is a system with one degree of freedom, which is able to adjust the active or reactive power of a transmission line, whereas each of the remaining converters is a system with two degrees of freedom, which is able to adjust simultaneously the active and reactive power of a plurality of transmission lines, thus avoiding efficiently the congestion of a transmission system. When the Newton-Raphson method is used to calculate unknown control variables, the variables of the interline power flow controller are expressed as d-q axis components using orthogonal projection technology. This model can preserve the characteristic of rapid convergence and reduce both the complexity of computation and the number of the additional iteration variables due to the introduction of IPFC.

IPFC Static Model

Operating Principle of IPFC

Figure 1:
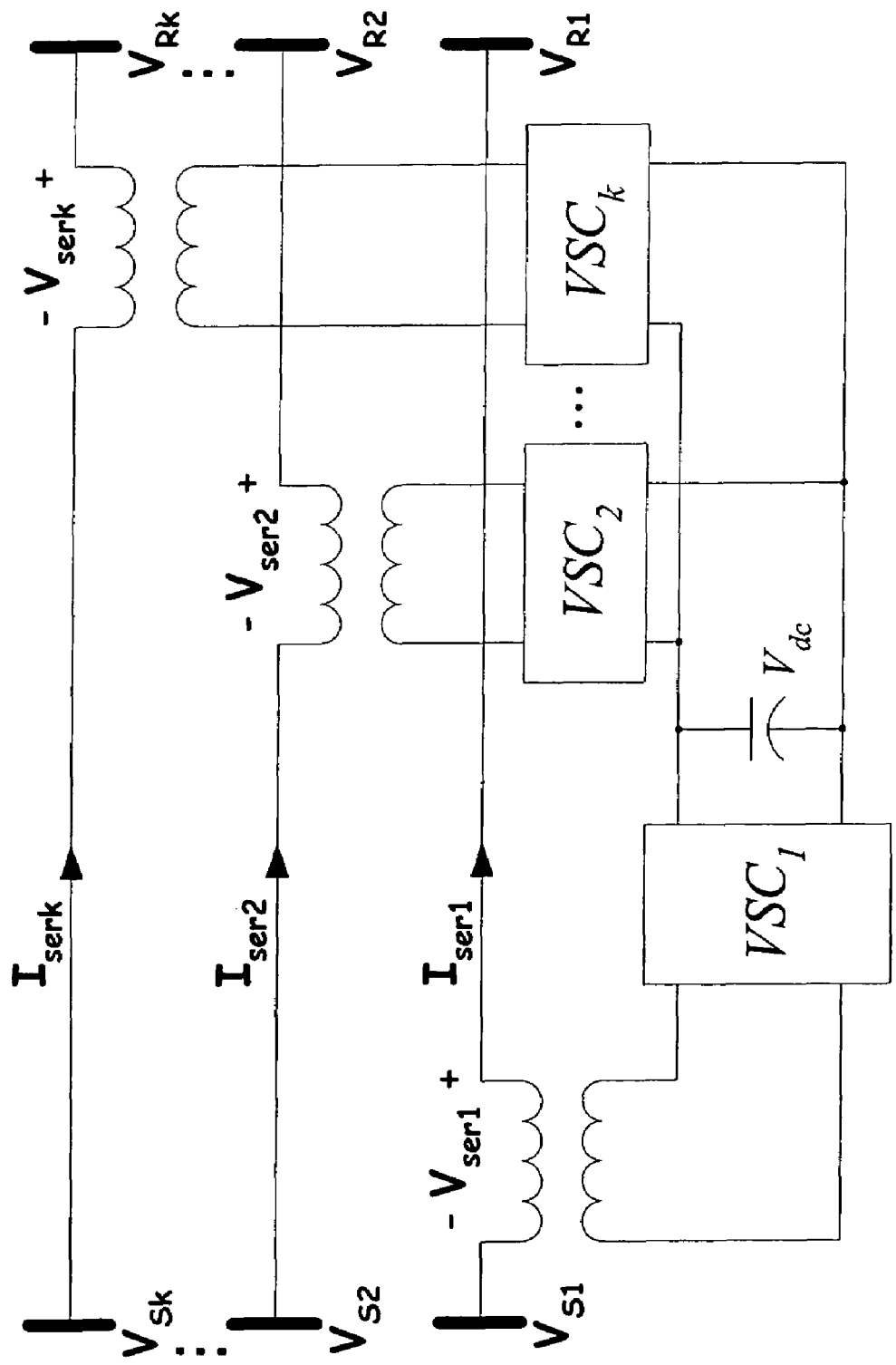
FIG. 1 shows a framework of Interline Power Flow Controller (IPFC) of the present invention.

The framework of the Interline Power Flow Controller (IPFC) is shown in FIG. 1, wherein it comprises a plurality of VSCs and a DC coupling capacitor. VSC1 is a system with one degree of freedom, which can compensate the reactive power to the transmission line through a coupling transformer, and then can balance the active power with VSC2~VSCn by modulating the voltage of the DC coupling capacitor. Each of VSC2~VSCn is a control system with two degrees of freedom. The DC sides of VCSs are linked together to the DC coupling capacitor. All converters are linked to the transmission lines via coupling transformers. Each of the transmission lines is separately compensated with the reactive power. In addition, the active power is transferred among the transmission lines via the DC link of VSCs. The VSC2~VSCn of the present invention can simultaneously compensate both the active and reactive power, while various transmission lines are controlled independently with each other, thereby avoiding efficiently the congestion of the system.

IPFC Equivalent Circuit

For the steady-state model of the IPFC according to the present invention, the variables of the models are decomposed into two orthogonal components, d-axis and q-axis components, thus ensuring that the active and reactive power of transmission lines are subjected to decoupling control. The new model adjusts the active power of the transmission lines using the converter's d-axis current, and the q-axis current is responsible for adjusting the reactive power. Meanwhile, the d-axis current of VSC1 is responsible for adjusting the voltage of the DC coupling capacitor. After a d-q decomposition, the voltage variable is expressed as:

$$V_{xk}^D + jV_{xk}^Q = V_{xk} e^{j(\theta_{xk} + \theta_{s1})} \quad (1)$$

wherein, the superscript "D" and "Q" refer to the d component and q component of the specified variable; the subscript "k" refers to the converter of no. k; and the subscript "x" can be replaced by "s", "r", or "ser", for indicating the variables related to the sending-bus, the receiving-end bus and the series branch of the IPFC.

Figure 2:
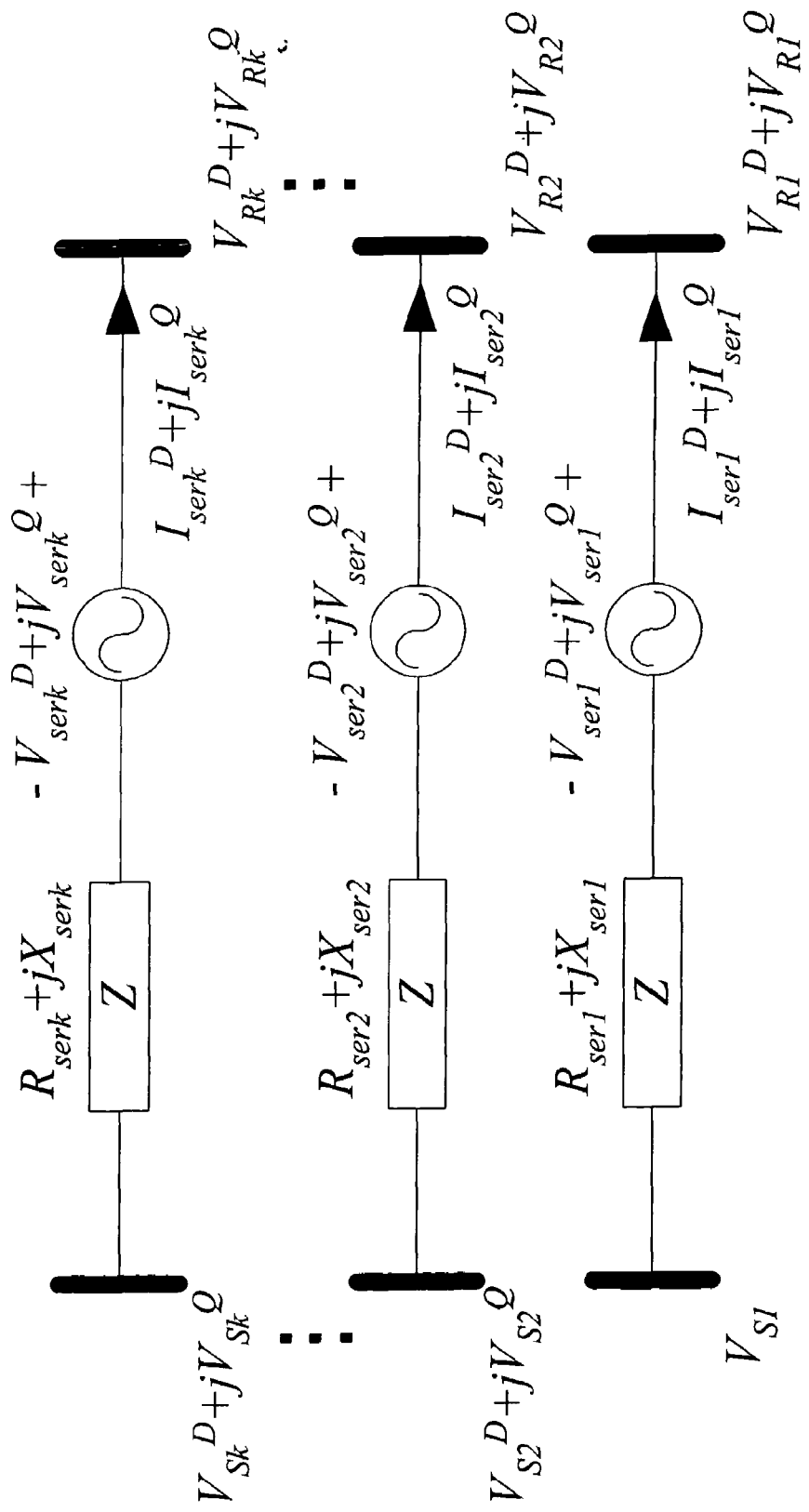
FIG. 2 shows an equivalent circuit of Interline Power Flow Controller (IPFC) of the present invention.

Based on a d-q axis decomposition, the present invention provides a steady-state model of an Interline Power Flow Controller (IPFC). The equivalent circuit of a static model of an IPFC is shown in FIG. 2, where the IPFC's series branch represents a voltage source and equivalent impedance, while the impedance models the coupling transformer. If the converters are lossless, the transferred active power among converters is expressed as:

$$P_{dc} = P_{ser1} + \sum_{k=2}^{n} P_{serk} = 0 \quad (2)$$

where, Pserk is the active power injected by VSCk, and SSSC refers to a special version of the Interline Power Flow Controller (IPFC). Because the SSSC is with a single series branch, equation (2) becomes $P_{dc} = P_{ser1}$.

IPFC Power Flow Model

IPFC Equivalent Load Model

The IPFC model of the present invention is represented by nonlinear load demands at the terminal buses of the IPFC. The equivalent load demands can be modified at each iteration according to control objectives and the voltage of the buses. Based on the d-q decomposition, the first series branch's current of IPFC model is expressed as:

$$\begin{bmatrix} I_{ser1}^D \\ I_{ser1}^Q \end{bmatrix} = \frac{1}{R_{ser1}^2 + X_{ser1}^2} \begin{bmatrix} R_{ser1} & -X_{ser1} \\ X_{ser1} & R_{ser1} \end{bmatrix} \begin{bmatrix} V_{s1} + V_{ser1}^D - V_{r1}^D \\ V_{ser1}^Q - V_{r1}^Q \end{bmatrix} \quad (3)$$

$V_{r1}^D$ and $V_{r1}^Q$ in equation (3) can be obtained from equation (1). The d-q components $V_{ser1}^D$ and $V_{ser1}^Q$ of the first branch are unknown variables when using Newton-Raphson (N-R) method, which may be updated at each iteration;

According to the definition of the complex power, the load demand of the first branch of IPFC is expressed as:

$$\begin{bmatrix} p_{s1} \\ Q_{s1} \end{bmatrix} = -\begin{bmatrix} V_{s1} & 0 \\ 0 & -V_{s1} \end{bmatrix} \begin{bmatrix} I_{ser1}^D \\ I_{ser1}^Q \end{bmatrix} \quad (4)$$

$$\begin{bmatrix} p_{r1} \\ Q_{r1} \end{bmatrix} = -\begin{bmatrix} V_{r1}^Q & V_{r1}^Q \\ V_{r1}^Q & -V_{r1}^Q \end{bmatrix} \begin{bmatrix} I_{ser1}^D \\ I_{ser1}^Q \end{bmatrix} \quad (5)$$

Apart from the first branch, other branches of IPFC control the objectives according to different power flows, with the equivalent load demand expressed as:

$$\begin{bmatrix} p_{rk} \\ Q_{rk} \end{bmatrix} = -\begin{bmatrix} P_{linek}^{ref} \\ Q_{linek}^{ref} \end{bmatrix}, \quad k = 2, \Lambda, n \quad (6)$$

where, $P_{linek}^{ref}$ and $Q_{linek}^{ref}$ are reference values of active and reactive power of the bus at the receiving end of the No. k branch. Apart from the first branch, the equivalent load demand of the other branches of IPFC at the sending-end bus is:

$$\begin{bmatrix} P_{sk} \\ Q_{sk} \end{bmatrix} = -\begin{bmatrix} V_{sk}^D & V_{sk}^Q \\ V_{sk}^Q & -V_{sk}^D \end{bmatrix}\begin{bmatrix} I_{serk}^D \\ I_{serk}^Q \end{bmatrix} \quad (7)$$

where, $$\begin{bmatrix} I_{serk}^D \\ I_{serk}^Q \end{bmatrix} = -\frac{1}{V_{rk}^2}\begin{bmatrix} V_{rk}^D & V_{rk}^Q \\ V_{rk}^Q & -V_{rk}^D \end{bmatrix}\begin{bmatrix} P_{rk} \\ Q_{rk} \end{bmatrix}$$

Power Compensation of Converter

After simple algebraic manipulation, the power injected by VSCs is:

$$P_{ser1} = I_{ser1}^D V_{ser1}^D + I_{ser1}^Q V_{ser1}^Q \quad (8)$$

$$P_{serk} = I_{serk}^D (V_{rk}^D - V_{sk}^D) + I_{serk}^Q (V_{rk}^Q + V_{sk}^Q) + (I_{serk}^{D2} + I_{serk}^{Q2})R_{serk} \quad (9)$$

VSC1 is used to maintain a balanced active power among converters. In addition, VSC1 provides a compensation of the reactive power, and controls the active or reactive power between the sending-end s1 and the receiving-end r1 of the bus:

$$f_{ser1} = P_{r1} + P_{line1}^{ref} = 0 \text{ or } f_{ser1} = Q_{r1} + Q_{line1}^{ref} \quad (10)$$

N-R Iteration Algorithm

Power flow solution can be obtained from Newton-Raphson method, with the iteration equation expressed below:

$$x^{(k+1)} = x^{(k)} - J^{-1}f(x) \quad (11)$$

where x is an unknown vector. The state variables in x include voltage magnitude and phase angle of the bus as well as independent control variables of IPFC. f(x) refers to the mismatch vector of the active and reactive power of buses. J refers to the corresponding Jacobian matrix. Because each branch of the IPFC is replaced by two nonlinear equivalent loads, the mismatch vector is modified as follows:

$$f' = f + \Delta f_{IPFC} \quad (12)$$

where, $$\Delta f_{IPFC} = [\Delta f_{bus} \mid \Delta f_{control}]^T$$
$$= [P_{s1} \ Q_{s1} \ P_{r1} \ Q_{r1} \ P_{sk} \ Q_{sk} \ P_{rk} \ Q_{rk} \mid P_{dc} \ f_{ser1}]^T$$

f' is the mismatch vector considering the equivalent load of Interline Power Flow Controller (IPFC), $\Delta f_{IPFC}$ includes $\Delta f_{Bus}$ and $\Delta f_{Control}$, of which $\Delta f_{Bus}$ refers to the variable of bus terminal of Interline Power Flow Controller (IPFC), and $\Delta f_{Control}$ refers to control constraints related to Interline Power Flow Controller (IPFC).

The unknown vectors will be changed when an IPFC is embedded in a power system. In Interline Power Flow Controller (IPFC), $V_{ser1}^D$ and $V_{ser1}^Q$ indicate state variables. Thus, the elements of the unknown vector related to Interline Power Flow Controller (IPFC) can be expressed as:

$$x_{IPFC} = [x_{bus} \mid x_{Control}]^T \quad (13)$$
$$= [\theta_{s1} \ V_{s1} \ \theta_{r1} \ V_{r1} \ \theta_{sk} \ V_{sk} \ \theta_{rk} \ V_{rk} \mid V_{ser1}^D \ V_{ser1}^Q]^T$$

where, $x_{Bus}$ includes the original state variables and $x_{Control}$ includes the control variables introduced by IPFC. The Jacobian matrix of IPFC can be obtained from the first-order partial differentiation for f':

$$J' = J + \Delta J_{IPFC} \quad (14)$$

where:

$$\Delta J_{IPFC} = \begin{bmatrix} \frac{\partial P_{s1}}{\partial \theta_{s1}} & \frac{\partial P_{s1}}{\partial \theta_{s1}} & \frac{\partial P_{s1}}{\partial \theta_{r1}} & \frac{\partial P_{s1}}{\partial V_{r1}} & 0 & 0 & 0 & 0 & \Big| & \frac{\partial P_{s1}}{\partial V_{ser1}^D} & \frac{\partial P_{s1}}{\partial V_{ser1}^Q} \\ \frac{\partial Q_{s1}}{\partial \theta_{s1}} & \frac{\partial Q_{s1}}{\partial V_{s1}} & \frac{\partial Q_{s1}}{\partial \theta_{r1}} & \frac{\partial Q_{s1}}{\partial V_{r1}} & 0 & 0 & 0 & 0 & \Big| & \frac{\partial Q_{s1}}{\partial V_{ser1}^D} & \frac{\partial Q_{s1}}{\partial V_{ser1}^D} \\ \frac{\partial P_{r1}}{\partial \theta_{s1}} & \frac{\partial P_{r1}}{\partial V_{s1}} & \frac{\partial P_{r1}}{\partial \theta_{r1}} & \frac{\partial P_{r1}}{\partial V_{r1}} & 0 & 0 & 0 & 0 & \Big| & \frac{\partial P_{r1}}{\partial V_{ser1}^D} & \frac{\partial P_{r1}}{\partial V_{ser1}^D} \\ \frac{\partial Q_{r1}}{\partial \theta_{s1}} & \frac{\partial Q_{r1}}{\partial V_{s1}} & \frac{\partial Q_{r1}}{\partial \theta_{r1}} & \frac{\partial P_{s1}}{\partial V_{s1}} & 0 & 0 & 0 & 0 & \Big| & \frac{\partial Q_{r1}}{\partial V_{ser1}^D} & \frac{\partial Q_{r1}}{\partial V_{ser1}^D} \\ \frac{\partial P_{sk}}{\partial \theta_{s1}} & 0 & 0 & 0 & \frac{\partial P_{sk}}{\partial \theta_{sk}} & \frac{\partial P_{sk}}{\partial V_{sk}} & \frac{\partial P_{sk}}{\partial \theta_{rk}} & \frac{\partial P_{sk}}{\partial V_{rk}} & \Big| & 0 & 0 \\ \frac{\partial Q_{sk}}{\partial \theta_{s1}} & 0 & 0 & 0 & \frac{\partial Q_{sk}}{\partial \theta_{sk}} & \frac{\partial Q_{sk}}{\partial V_{sk}} & \frac{\partial Q_{sk}}{\partial \theta_{rk}} & \frac{\partial Q_{sk}}{\partial V_{rk}} & \Big| & 0 & 0 \\ 0 & 0 & 0 & 0 & 0 & 0 & 0 & 0 & \Big| & 0 & 0 \\ 0 & 0 & 0 & 0 & 0 & 0 & 0 & 0 & \Big| & 0 & 0 \\ - & - & - & - & - & - & - & - & + & - & - \\ \frac{\partial P_{dc}}{\partial \theta_{s1}} & \frac{\partial P_{dc}}{\partial V_{s1}} & \frac{\partial P_{dc}}{\partial \theta_{r1}} & \frac{\partial P_{dc}}{\partial V_{r1}} & \frac{\partial P_{dc}}{\partial \theta_{sk}} & \frac{\partial P_{dc}}{\partial V_{sk}} & \frac{\partial P_{dc}}{\partial \theta_{rk}} & \frac{\partial P_{dc}}{\partial V_{rk}} & \Big| & \frac{\partial P_{dc}}{\partial V_{ser1}^D} & \frac{\partial P_{dc}}{\partial V_{ser1}^Q} \\ \frac{\partial f_{ser1}}{\partial \theta_{s1}} & \frac{\partial f_{ser1}}{\partial V_{s1}} & \frac{\partial f_{ser1}}{\partial \theta_{r1}} & \frac{\partial f_{ser1}}{\partial V_{r1}} & 0 & 0 & 0 & 0 & \Big| & \frac{\partial f_{ser1}}{\partial V_{ser1}^D} & \frac{\partial f_{ser1}}{\partial V_{ser1}^Q} \end{bmatrix}$$

The elements at upper left corner are the original Jacobian matrix. The size of the Jacobian matrix is increased by two. Accordingly, the size of the unknown vector and the mismatch vector will increase by two due to the introduction of the IPFC. It can facilitate the fast convergence speed and preserve the original quadratic convergence characteristic. This theoretical derivation will be verified by subsequent simulation results.

Equivalent Series Voltage of Converter

If the power flow solution converges, the d-q components of the series voltage of VSC2-VSCn may be expressed as:

$$\begin{bmatrix} V_{serk}^D \\ V_{serk}^Q \end{bmatrix} = \begin{bmatrix} R_{serk} & -X_{serk} \\ X_{serk} & R_{serk} \end{bmatrix} \begin{bmatrix} I_{serk}^D \\ I_{serk}^Q \end{bmatrix} + \begin{bmatrix} V_{rk}^D - V_{sk}^D \\ V_{rk}^Q - V_{sk}^Q \end{bmatrix}, \quad k = 2, \Lambda, n \quad (15)$$

Thus, the size and phase of synchronous voltage of VSC2-VSCn can be expressed as:

$$V_{serk} = V_{serk} \angle \theta_{serk} = \sqrt{V_{serk}^{D2} + V_{serk}^{Q2}} \angle \left( \tan^{-1} \frac{V_{serk}^Q}{V_{serk}^D} + \theta_{s1} \right) \quad (16)$$

Case Analysis

Figure 3:
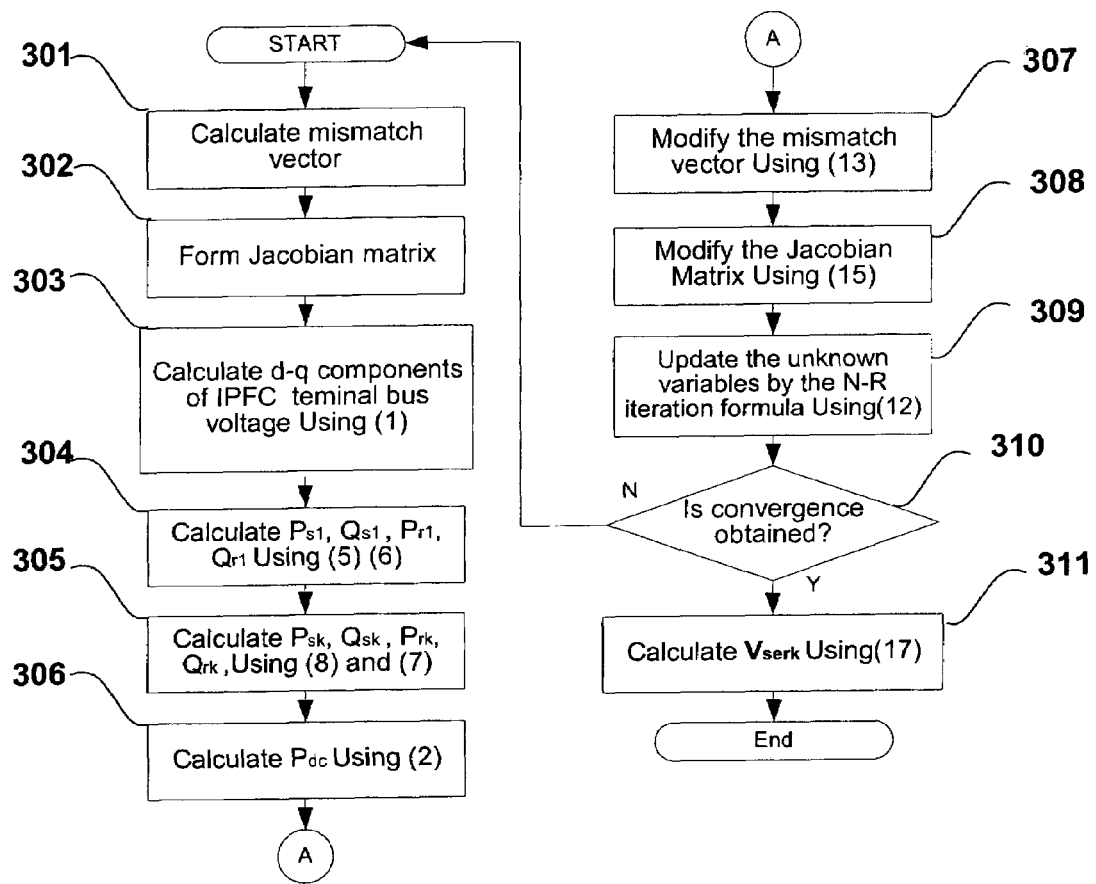
FIG. 3 shows the flow chart of calculating power flow with introduction of IPFC model.

To validate the IPFC model of the present invention, different test systems are imbedded with the IPFCs. FIG. 3 shows a flow chart of calculating power flow solution with incorporation of IPFC model. The first step (301) is to calculate the original mismatch vector, then establish the corresponding Jacobian matrix in step (302). Next, step (303) is to obtain d-q components of bus voltage $V_r^D$ and $V_r^Q$ at the receiving-end of IPFC after using an orthogonal decomposition, and step (304) to calculate the active and reactive power of the sending-end and receiving-end buses of VSC1. Furthermore, step (305) is to calculate the active and reactive power of the sending-end and receiving-end buses of VSC2-VSCn, step (306) to calculate the active power flowing from the DC coupling capacitor Pdc, followed by steps (307) and (308) to modify the mismatch vector and the Jacobian matrix, and step (309) to update the unknown vector via Newton-Raphson iteration, step (310) to judge the convergence of the flow solution. Otherwise, return to step (301) to recalculate the mismatch vector. In the case of convergence, the final step (311) is to obtain the voltage of converter. In the end, steady-state model of IPFC of the present invention and GUPFC of FACTS family are added into two test systems, whereby Matpower 2.0 is used to verify the performance. The test system includes IEEE 57 bus system and IEEE 118 bus system, which conduct analysis in the following four cases:

1. Case A: analyze IEEE 57 bus system, without installation of any Interline Power Flow Controller (IPFC).
2. Case B: IEEE 57 bus system is embedded with an Interline Power Flow Controller (IPFC) and a GUPFC. The Interline Power Flow Controller (IPFC) installed between the transmission line 8-7 and the transmission line 9-13 to control the active power of transmission line 8-7 and both the active and reactive power of transmission line 9-13. The GUPFC controls both the voltage magnitude of bus 56 and both the active and reactive power flow of the transmission line 56-42 and transmission line 41-11.
3. Case C: analyze IEEE 118 bus system, without installation of Interline Power Flow Controller (IPFC).
4. Case D: IEEE 118 bus system is embedded with two 2 Interline Power Flow Controller (IPFC) and 2 GUPFC. IPFC1 installed between the transmission line 12-11 and transmission line 12-3 to control the active power of the transmission line 12-11 and both the active and reactive power of transmission line 12-3. IPFC2 installed between the transmission line 80-77 and transmission line 80-97 to control the active power of transmission line 80-77 and both the active and reactive power of the transmission line 80-97. GUPFC1 is used to control the voltage magnitude of bus 45 and both the active and reactive power flow of the transmission line 45-44 and transmission line 45-46. GUPFC2 is used to control the voltage magnitude of bus 94 and both the active and reactive power flow of transmission lines 94-95, 94-93 and 94-100.

It is assumed that all parameters of the coupling transformers are the same: Rser=0.01 p.u. and Xser=0.1 p.u. The permissible tolerance of Newton-Raphson iteration is 10-12, and control variables $V_{ser1}^D$ and $V_{ser2}^Q$ of Interline Power Flow Controller (IPFC) have zero initial values. The comparison of iteration numbers required for system convergence in different cases is listed in Table 1 (e.g. FIG. 7). The simulation results show that the system can improve its stability and maintain an excellent convergence feature with introduction of an IPFC model.

Figure 4:
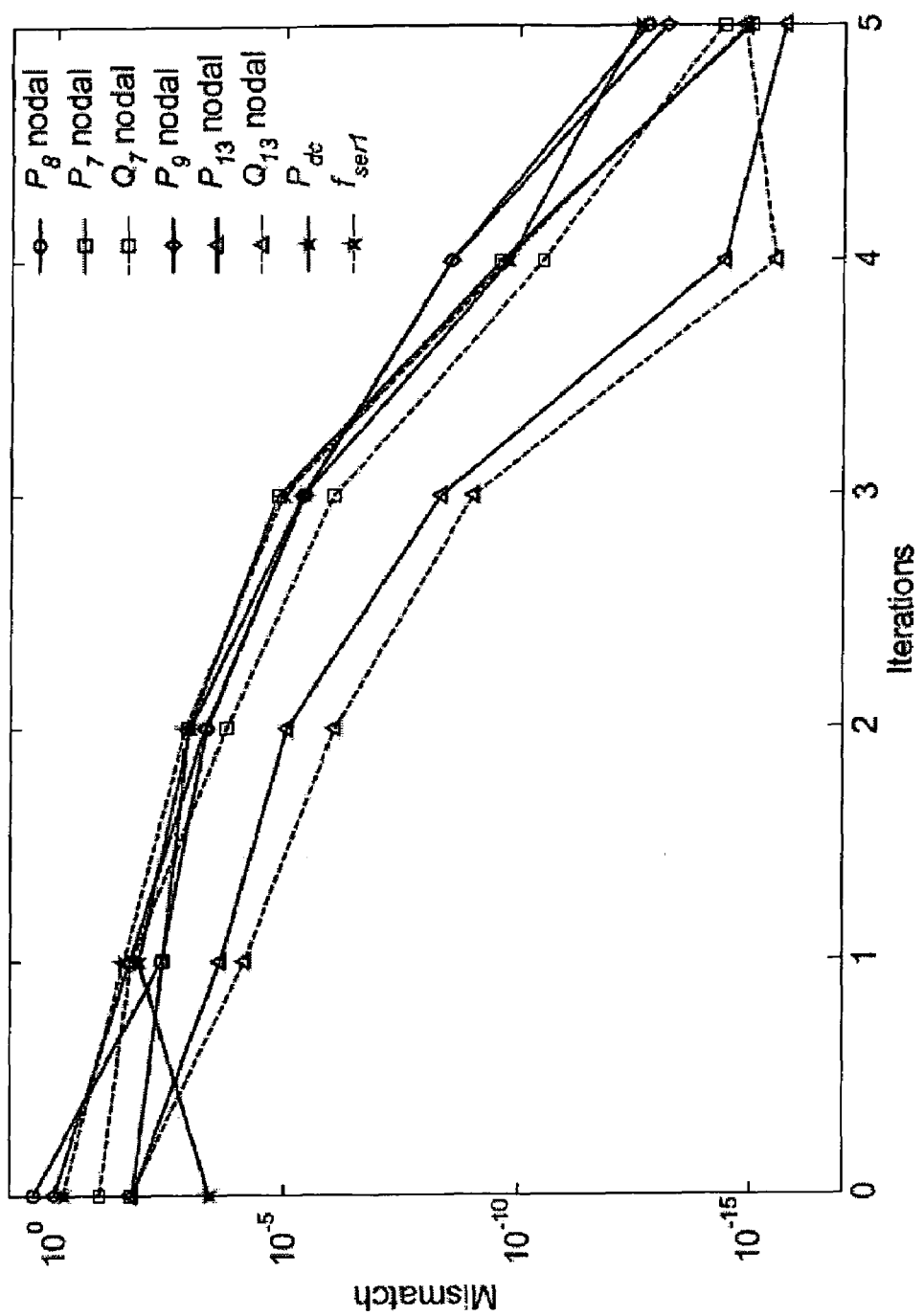
FIG. 4 depicts the power mismatch of bus terminal voltage of Interline Power Flow Controller (IPFC) of the present invention.
Figure 5:
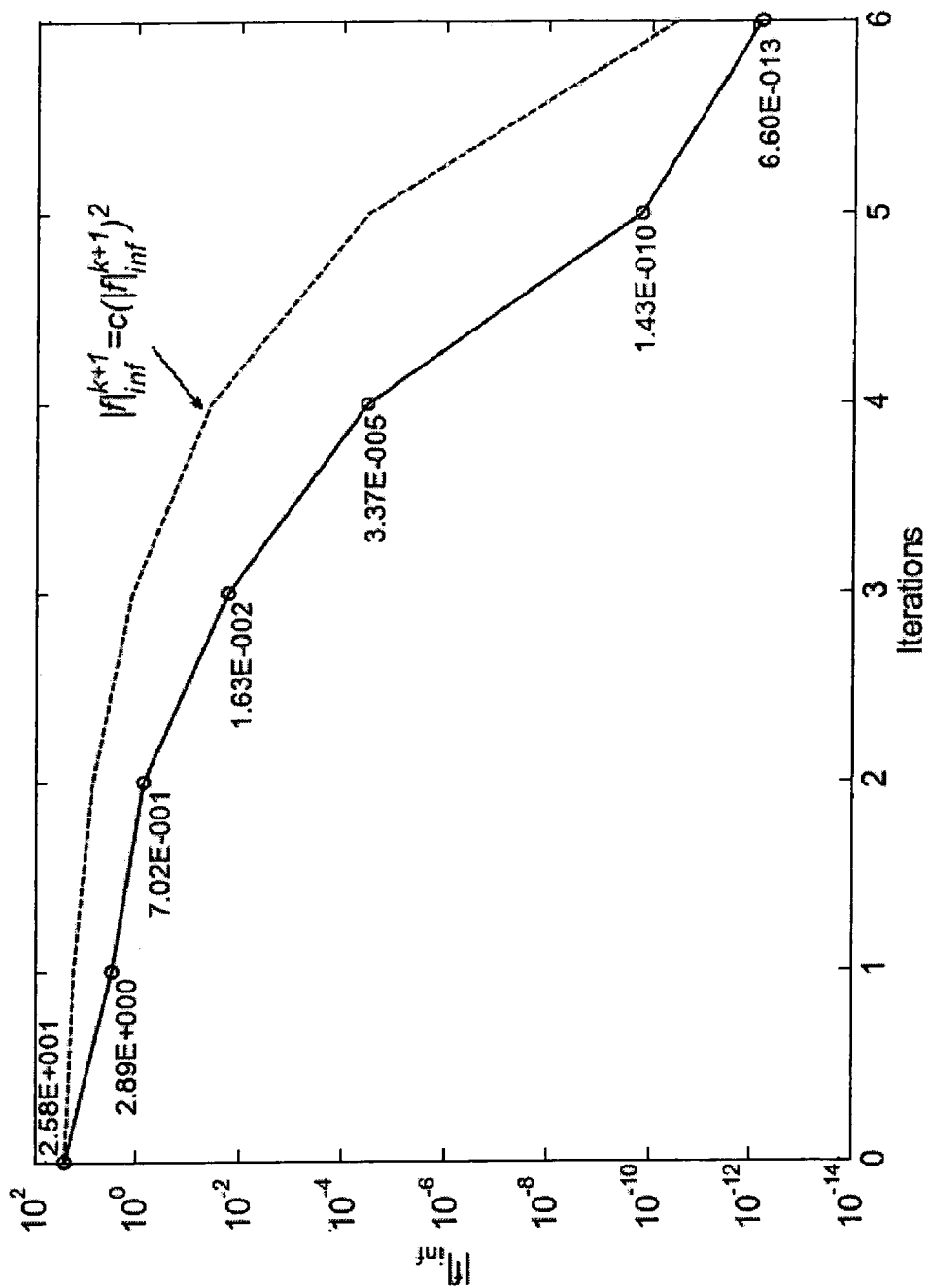
FIG. 5 depicts the quadratic convergence characteristic of a power system embedded with Interline Power Flow Controller (IPFC).
Figure 6:
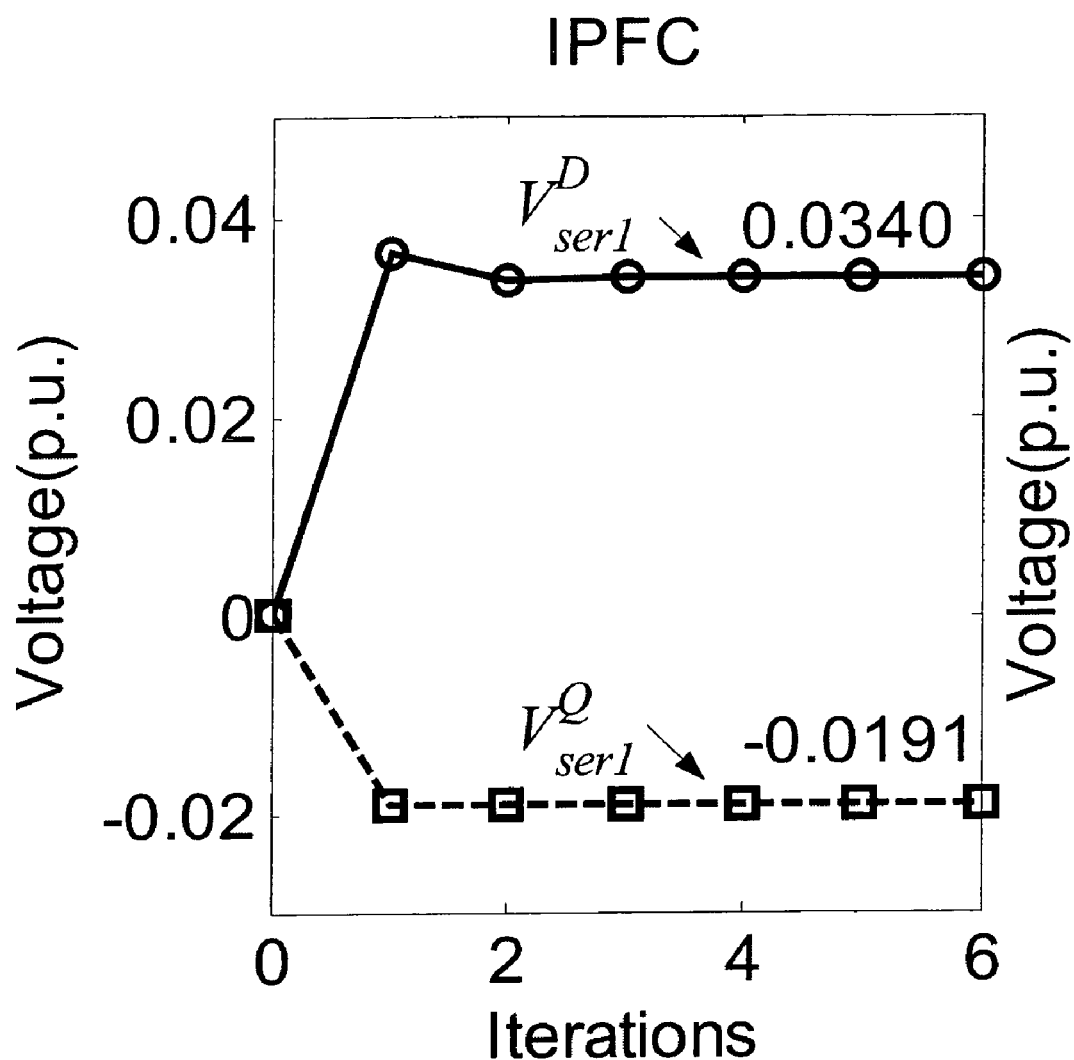
FIG. 6 Convergence characteristics of control parameters of IPFC.

To verify the applicability of a model initiated by the present invention, Interline Power Flow Controller (IPFC) is connected to different sending-end busses. FIG. 4 shows the power mismatch of bus terminal voltage with introduction of Interline Power Flow Controller (IPFC), wherein the mismatch is close to 10-15 after 5 iterations. The iteration numbers of the test system required for a power flow solution in different cases are listed in Table 1. For the same test system embedded with a IPFC model initiated by Zhang, X.-P., "Modeling of the Interline Power Flow Controller and the Generalized Unified Power Controller in Newton Power Flow" (IEE Proc. Gener. Trans. Distrib., Vol. 3, No. 150, pp. 268-274, 2003), 8 iterations are required to obtain a converged solution. But in fact, the test system embedded with IPFC of the present invention can obtain a converged solution after 6 iterations, showing that IPFC of the present invention features a rapid convergence. FIG. 5 depicts the results of quadratic convergence for IPFC in Case D, where the dashed line is a typical quadratic convergence curve, showing that quadratic convergence curve of the present invention is similar to a typical curve. FIG. 6 depicts the convergence pattern of control variables of IPFC in Case D which can reach to a nearly target value after 2 iterations, showing an excellent convergence feature of this system.

In brief, the aforementioned involve an innovative invention that can promote overall economic efficiency thanks to its many functions and actual value. And, no similar products or equivalent are applied in this technical field, so it would be appreciated that the present invention is granted patent as it meets the patent-pending requirements.

What is claimed is:

1. A method for calculating power flow solution of a power transmission network that includes the interline power flow controllers (IPFCs), said IPFC having a plurality of voltage source converters (VSCs), wherein the DC sides of said VSCs are linked together to a DC coupling capacitor and the AC sides are linked to the transmission lines of said power transmission network through coupling transformers; said VSCs being modeled by a plurality of series branches, each series branch comprising a voltage source in series with an impedance; the first series branch being able to adjust the active or reactive power of a transmission line of said power transmission network; each of the remaining series branches being able to adjust simultaneously the active and reactive power of a transmission line of said power transmission network; said power flow solution including the voltage at each bus of said power transmission network and the equivalent voltages of the VSCs; said method comprising:

A) calculating an original mismatch vector without considering the IPFC;
B) establishing a Jacobian matrix corresponding to the original mismatch vector in A);
C) obtaining d-q components of a receiving-end bus voltage of the IPFC by a d-q axis decomposition;
D) calculating equivalent active and reactive loading at sending-end and receiving-end buses of a first branch of the IPFC;
E) calculating equivalent active and reactive loading at sending-end and receiving-end buses of remaining series branches;
F) calculating active power flowing from a DC coupling capacitor;
G) modifying the original mismatch vector and the Jacobian matrix;
H) updating an unknown vector by an iteration formula;
I) judging convergence of the power flow solution; if the solution converges within a specified tolerance, going to J); otherwise, going to A);
J) calculating the equivalent voltage of a converter; and
k) using the result in J in setting up a steady state model of IPFC.

2. A method in accordance with claim 1, wherein the d-q axis decomposition of the receiving-end bus voltage in (C) is calculated as follows:

$$V_{r1}^D + jV_{r1}^Q = |V_{r1}|e^{j(\theta_{r1} - \theta_{s1})}.$$

3. A method in accordance with claim 2, wherein the equivalent active and reactive loading at the sending-end and receiving-end buses of the first series branch of the IPFC in (D) is obtained as follows:

$$\begin{bmatrix} P_{s1} \\ Q_{s1} \end{bmatrix} = - \begin{bmatrix} V_{s1} & 0 \\ 0 & -V_{s1} \end{bmatrix} \begin{bmatrix} I_{ser1}^D \\ I_{ser1}^Q \end{bmatrix}$$

$$\begin{bmatrix} P_{r1} \\ Q_{r1} \end{bmatrix} = - \begin{bmatrix} V_{r1}^D & V_{r1}^Q \\ V_{r1}^Q & -V_{r1}^D \end{bmatrix} \begin{bmatrix} I_{ser1}^D \\ I_{ser1}^Q \end{bmatrix}.$$

where $$\begin{bmatrix} I_{ser1}^D \\ I_{ser1}^Q \end{bmatrix} = \frac{1}{R_{ser1}^2 + X_{ser1}^2} \begin{bmatrix} R_{ser1} & -X_{ser1} \\ X_{ser1} & R_{ser1} \end{bmatrix} \begin{bmatrix} V_{s1} + V_{ser1}^D - V_{r1}^D \\ V_{ser1}^Q - V_{r1}^Q \end{bmatrix}.$$

4. A method in accordance with claim 3, wherein the equivalent active and reactive loading at the sending-end and receiving-end buses of remaining series branches in (E) are obtained as follows:

$$\begin{bmatrix} P_{sk} \\ Q_{sk} \end{bmatrix} = - \begin{bmatrix} V_{sk}^D & V_{sk}^Q \\ V_{sk}^Q & -V_{sk}^D \end{bmatrix} \begin{bmatrix} I_{serk}^D \\ I_{serk}^Q \end{bmatrix}$$

$$\begin{bmatrix} P_{rk} \\ Q_{rk} \end{bmatrix} = - \begin{bmatrix} P_{linek}^{ref} \\ Q_{linek}^{ref} \end{bmatrix}, \quad k = 2, \Lambda, n$$

where, $$\begin{bmatrix} I_{serk}^D \\ I_{serk}^Q \end{bmatrix} = -\frac{1}{V_{rk}^2} \begin{bmatrix} V_{rk}^D & V_{rk}^Q \\ V_{rk}^Q & -V_{rk}^D \end{bmatrix} \begin{bmatrix} P_{rk} \\ Q_{rk} \end{bmatrix}$$

5. A method in accordance with claim 4, wherein the active power flowing from the DC coupling capacitor in (F) is obtained as follows:

$$P_{dc} = P_{ser1} + \sum_{k=2}^{n} P_{serk} = 0,$$

where $$P_{ser1} = I_{ser1}^D V_{ser1}^D + I_{ser1}^Q V_{ser1}^Q$$

$$P_{serk} = I_{serk}^D (V_{rk}^D - V_{sk}^D) + I_{serk}^Q (V_{rk}^Q + V_{sk}^Q) + \left( I_{serk}^{D^2} + I_{serk}^{Q^2} \right) R_{serk}.$$

6. A method in accordance with claim 5, wherein the original mismatch vector and the Jacobian matrix in (G) is modified as follows:

$$f' = f + \Delta f_{IPFC};$$

$$J' = J + \Delta J_{IPFC};$$

where, $$\Delta f_{IPFC} = [\Delta f_{bus} | \Delta f_{control}]^T,$$

$$= [P_{s1} \quad Q_{s1} \quad P_{r1} \quad Q_{r1} \quad P_{sk} \quad Q_{sk} \quad P_{rk} \quad Q_{rk} | P_{dc} \quad f_{ser1}]^T,$$

-continued $$\Delta J_{IPFC} = \begin{bmatrix} \frac{\partial P_{s1}}{\partial \theta_{s1}} & \frac{\partial P_{s1}}{\partial \theta_{s1}} & \frac{\partial P_{s1}}{\partial \theta_{r1}} & \frac{\partial P_{s1}}{\partial V_{r1}} & 0 & 0 & 0 & 0 & | & \frac{\partial P_{s1}}{\partial V_{ser1}^D} & \frac{\partial P_{s1}}{\partial V_{ser1}^D} \\ \frac{\partial Q_{s1}}{\partial \theta_{s1}} & \frac{\partial Q_{s1}}{\partial V_{s1}} & \frac{\partial Q_{s1}}{\partial \theta_{r1}} & \frac{\partial Q_{s1}}{\partial V_{r1}} & 0 & 0 & 0 & 0 & | & \frac{\partial Q_{s1}}{\partial V_{ser1}^D} & \frac{\partial Q_{s1}}{\partial V_{ser1}^D} \\ \frac{\partial P_{r1}}{\partial \theta_{s1}} & \frac{\partial P_{r1}}{\partial V_{s1}} & \frac{\partial P_{r1}}{\partial \theta_{r1}} & \frac{\partial P_{r1}}{\partial V_{r1}} & 0 & 0 & 0 & 0 & | & \frac{\partial P_{r1}}{\partial V_{ser1}^D} & \frac{\partial P_{r1}}{\partial V_{ser1}^D} \\ \frac{\partial Q_{r1}}{\partial \theta_{s1}} & \frac{\partial Q_{r1}}{\partial V_{s1}} & \frac{\partial Q_{r1}}{\partial \theta_{r1}} & \frac{\partial P_{s1}}{\partial V_{s1}} & 0 & 0 & 0 & 0 & | & \frac{\partial Q_{r1}}{\partial V_{ser1}^D} & \frac{\partial Q_{r1}}{\partial V_{ser1}^D} \\ \frac{\partial P_{sk}}{\partial \theta_{s1}} & 0 & 0 & 0 & \frac{\partial P_{sk}}{\partial \theta_{sk}} & \frac{\partial P_{sk}}{\partial V_{sk}} & \frac{\partial P_{sk}}{\partial \theta_{rk}} & \frac{\partial P_{sk}}{\partial V_{rk}} & | & 0 & 0 \\ \frac{\partial Q_{sk}}{\partial \theta_{s1}} & 0 & 0 & 0 & \frac{\partial Q_{sk}}{\partial \theta_{sk}} & \frac{\partial Q_{sk}}{\partial V_{sk}} & \frac{\partial Q_{sk}}{\partial \theta_{rk}} & \frac{\partial Q_{sk}}{\partial V_{rk}} & | & 0 & 0 \\ 0 & 0 & 0 & 0 & 0 & 0 & 0 & 0 & | & 0 & 0 \\ 0 & 0 & 0 & 0 & 0 & 0 & 0 & 0 & | & 0 & 0 \\ - & - & - & - & - & - & - & - & + & - & - \\ \frac{\partial P_{dc}}{\partial \theta_{s1}} & \frac{\partial P_{dc}}{\partial V_{s1}} & \frac{\partial P_{dc}}{\partial \theta_{r1}} & \frac{\partial P_{dc}}{\partial V_{r1}} & \frac{\partial P_{dc}}{\partial \theta_{sk}} & \frac{\partial P_{dc}}{\partial V_{sk}} & \frac{\partial P_{dc}}{\partial \theta_{rk}} & \frac{\partial P_{dc}}{\partial \theta_{rk}} & | & \frac{\partial P_{dc}}{\partial V_{ser1}^D} & \frac{\partial P_{dc}}{\partial V_{ser1}^Q} \\ \frac{\partial f_{ser1}}{\partial \theta_{s1}} & \frac{\partial f_{ser1}}{\partial V_{s1}} & \frac{\partial f_{ser1}}{\partial \theta_{r1}} & \frac{\partial f_{ser1}}{\partial V_{r1}} & 0 & 0 & 0 & 0 & | & \frac{\partial f_{ser1}}{\partial V_{ser1}^D} & \frac{\partial f_{ser1}}{\partial V_{ser1}^Q} \end{bmatrix}.$$

7. A method in accordance with claim 6, wherein the unknown vector in (H) is updated by a Newton-Raphson iteration formula as follows:

$$x^{(k+1)} = x^{(k)} - J^{-1} f(x).$$

8. A method in accordance with claim 7, wherein in (J) is calculated as follows:

$$V_{serk} = V_{serk} \angle \theta_{serk} = \sqrt{V_{serk}^{D2} + V_{serk}^{D2}} \angle \left( \tan^{-1} \frac{V_{serk}^Q}{V_{serk}^D} + \theta_{s1} \right),$$

where $$\begin{bmatrix} V_{serk}^D \\ V_{serk}^Q \end{bmatrix} = \begin{bmatrix} R_{serk} & -X_{serk} \\ X_{serk} & R_{serk} \end{bmatrix} \begin{bmatrix} I_{serk}^D \\ I_{serk}^Q \end{bmatrix} + \begin{bmatrix} V_{rk}^D - V_{sk}^D \\ V_{rk}^Q - V_{sk}^Q \end{bmatrix}, \quad k = 2, \Lambda, n.$$

* * * * *